(12) United States Patent
Kim et al.

(10) Patent No.: US 10,599,148 B2
(45) Date of Patent: *Mar. 24, 2020

(54) MOBILE AUDIO INPUT DEVICE CONTROLLER

(71) Applicant: International Business Machines Corporation, Armonk, NY (US)

(72) Inventors: Minkyong Kim, Scarsdale, NY (US); Clifford A. Pickover, Yorktown Heights, NY (US); Valentina Salapura, Chappaqua, NY (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/798,430

(22) Filed: Oct. 31, 2017

(65) Prior Publication Data

US 2018/0046189 A1 Feb. 15, 2018

Related U.S. Application Data

(63) Continuation of application No. 15/172,401, filed on Jun. 3, 2016, now Pat. No. 9,836,055.

(51) Int. Cl.
*G05D 1/00* (2006.01)
*G06K 9/00* (2006.01)
(Continued)

(52) U.S. Cl.
CPC ......... *G05D 1/0094* (2013.01); *B64C 39/024* (2013.01); *G06F 3/017* (2013.01);
(Continued)

(58) Field of Classification Search
CPC ............... G05D 1/0094; B64C 39/024; B64C 2201/027; B64C 2201/108;
(Continued)

(56) References Cited

U.S. PATENT DOCUMENTS 5,291,558 A 3/1994 Ross
8,452,026 B2 5/2013 Sherman
(Continued)

FOREIGN PATENT DOCUMENTS

WO 2014080388 A2 5/2014

OTHER PUBLICATIONS

P. Mell et al., "The NIST Definition of Cloud Computing", National Institute of Standards and Technology, Information Technology Laboratory, Sep. 2011, pp. 1-7.
(Continued)

*Primary Examiner* — Aaron L Troost
(74) *Attorney, Agent, or Firm* — Law Office of Jim Boice

(57) ABSTRACT

A method, system, and/or computer program product controls operations of a mobile audio input device. One or more processors detect a first location of a mobile audio input device. The processor(s) detect a second location of the user. The processor(s) then direct the mobile audio input device to autonomously move from the first location to the second location and, in response to the mobile audio input device reaching the second location, to activate the microphone on the mobile audio input device.

19 Claims, 8 Drawing Sheets

(51) Int. Cl.
  *G06F 3/16* (2006.01)
  *G06F 3/01* (2006.01)
  *G06F 3/0346* (2013.01)
  *B64C 39/02* (2006.01)

(52) U.S. Cl.
  CPC ............ *G06F 3/0346* (2013.01); *G06F 3/167* (2013.01); *G06K 9/0063* (2013.01); *G06K 9/00335* (2013.01); *G06K 9/00355* (2013.01); *B64C 2201/027* (2013.01); *B64C 2201/108* (2013.01); *B64C 2201/12* (2013.01); *B64C 2201/141* (2013.01); *B64C 2201/146* (2013.01)

(58) Field of Classification Search
  CPC .......... B64C 2201/12; B64C 2201/141; B64C 2201/146; G06F 3/017; G06F 3/0346; G06F 3/167; G06K 9/00335
  See application file for complete search history.

(56) References Cited

U.S. PATENT DOCUMENTS

| | | | |
|---|---|---|---|
| 8,538,383 | B2 | 9/2013 | Moosavi et al. |
| 8,989,420 | B1 | 3/2015 | Hamer et al. |
| 9,022,324 | B1 | 10/2015 | Abhyanker |
| 9,409,645 | B1* | 8/2016 | Sopper ................. B64C 39/024 |
| 9,889,931 | B2 | 2/2018 | Xu et al. |
| 10,136,234 | B2 | 11/2018 | Di Censo et al. |
| 10,379,534 | B2 | 8/2019 | Visser et al. |
| 2014/0254896 | A1 | 9/2014 | Zhou et al. |
| 2015/0370250 | A1* | 12/2015 | Bachrach ............. G05D 1/0016 701/2 |
| 2016/0336020 | A1* | 11/2016 | Bradlow ................. G01S 19/49 |
| 2016/0340006 | A1* | 11/2016 | Tang ......................... B63C 9/01 |
| 2016/0379056 | A1* | 12/2016 | Taite ..................... H04N 7/188 348/144 |

OTHER PUBLICATIONS

"Voting System." Wikipedia: The Free Encyclopedia. Wikimedia Foundation, Inc. May 18, 2016. Web. Jun. 1, 2016.
"Leader Election." Wikipedia: The Free Encyclopedia. Wikimedia Foundation, Inc. Apr. 12, 2016. Web. Jun. 1, 2016.
"Bully Algorithm." Wikipedia: The Free Encyclopedia. Wikimedia Foundation, Inc. May 13, 2016. Web. Jun. 1, 2016.
Anonymous, "Leader Election Algorithm". stackoverflow.com. Stack Exchange, Inc. Feb. 10, 2011. Web. Jun. 1, 2016.
List of IBM Patents and Patent Applications Treated as Related, Oct. 30, 2017.

* cited by examiner

MOBILE AUDIO INPUT DEVICE CONTROLLER

BACKGROUND

The present disclosure relates to the field of drones. More specifically, the present disclosure relates to adjusting operations of a drone that includes a microphone for capturing sounds, including human speech.

A drone is a device that is capable of being remotely maneuvered without an on-board pilot. Drones may be aerial drones, terrestrial drones, or aquatic drones.

An aerial drone is an unmanned aircraft, also known as an unmanned aerial vehicle (UAV). That is, an aerial drone is an airborne vehicle that is capable of being piloted without an on-board human pilot. If autonomously controlled using an on-board computer and pre-programmed instructions, a UAV is called an autonomous drone. If remotely piloted by a human pilot, the UAV is called a remotely piloted aircraft (RPA).

A terrestrial drone is a device that runs on land, such as on a paved or unpaved surface, a track, a cushion of air, etc. Like an aerial drone, a terrestrial drone may be operated remotely or autonomously.

An aquatic drone is a device that operates on water, such as on a river, ocean, pond, etc. Like an aerial drone, an aquatic drone may be operated remotely or autonomously.

SUMMARY

A method, system, and/or computer program product controls operations of a mobile audio input device. One or more processors detect a first location of a mobile audio input device. The processor(s) detect a second location of the user. The processor(s) then direct the mobile audio input device to autonomously move from the first location to the second location and, in response to the mobile audio input device reaching the second location, to activate the microphone on the mobile audio input device.

DETAILED DESCRIPTION

Figure 1:
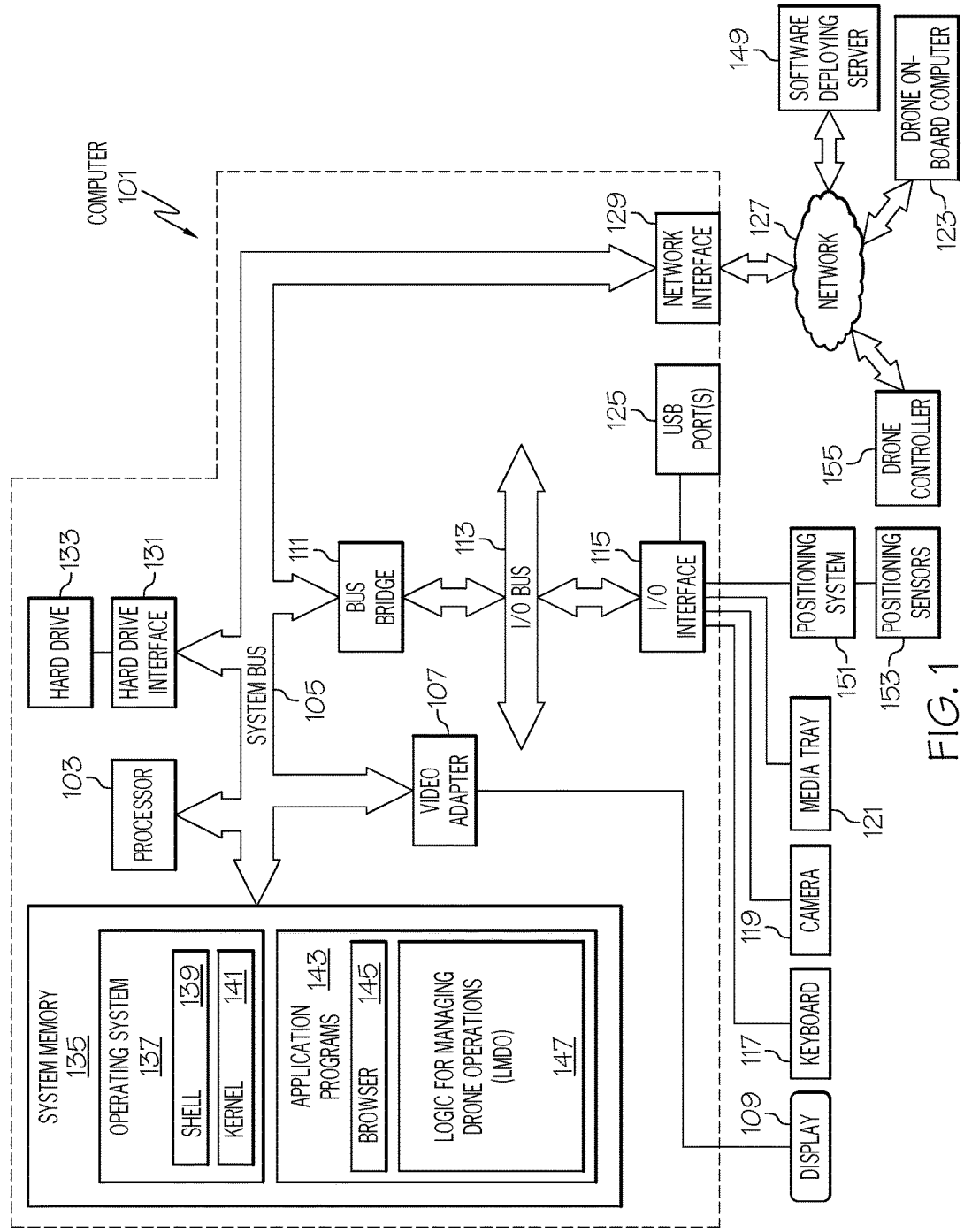
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Disclosed herein is a method and system that makes use of a mobile audio input device (e.g., flying drone with microphone, specialized terrestrial drone with microphone, an activated smart phone, etc.) and a hardware for determining to whom mobile devices are deployed (e.g., people with raised hands in an auditorium). This invention is useful in various scenarios, including but not limited to when improved audio capture is needed in a large auditorium, a conference room, a convention center, etc., in which multiple people wish to provide verbal feedback (e.g., to ask questions after a speaker has given a presentation).

Speakers at a conference or in a meeting often ask questions of the audience, and vice versa, but microphone deployment can be a challenge. The present invention meets this challenge through the use of a mobile audio input device (e.g., a flying drone with a microphone, a terrestrial drone with a microphone, activation of one or more smartphones, etc.) and a means for determining to whom mobile devices are deployed (e.g., people with raised hands in an auditorium).

As described herein and in one or more embodiments of the present invention, the mobile audio input device can be a flying drone with an attached/embedded microphone. For example, the drone can fly to a person in the audience who has his/her hand raised, or the drone may be a land-based (terrestrial) drone (that has a microphone) that drives to this person (e.g., on wheels).

In another embodiment of the present invention, the mobile audio input device is an electronic device (e.g., a smart phone) that is carried by the person. Thus, the smart phone is selectively activated to be able to capture speech input from that particular person for transmission to a public address (PA) system.

In one or more embodiments of the present invention, the smart phone displays a visual cue (e.g., its display turns green) and/or the drone displays a visual cue (e.g., turns on a green light on the drone) when the smart phone and/or the aerial/terrestrial drone has been activated to function as a transmitter of the user's speech input to the PA system.

In one or more embodiments of the present invention, the smart phone displays a visual cue (e.g., its display turns red) and/or the drone displays a visual cue (e.g., turns on a red light on the drone) when the smart phone and/or the aerial/terrestrial drone has been de-activated and/or is about to be de-activated (e.g., within 10 seconds).

In one or more embodiments of the present invention, the mobile audio input device provides various types of indicators (e.g., visual, tactile, and/or audio) when it is ready for a selected participant to provide speech input to the mobile audio input device (e.g., ask a question). For example, the mobile audio input device may indicate with a green light that it is ready to take a question, which can be transmitted in real time or buffered for subsequent transmission. Similarly, a red light indicator on the mobile audio input device can indicate the question is not being transmitted. That is, the red light indicator may indicate that the mobile audio input device has been deactivated and/or the buffer holding a digital copy of the user's question has been flushed.

In one or more embodiments of the present invention, the mobile audio input device determines which person should speak next (i.e., to which person should the mobile audio input device autonomously move and be activated to receive that person's speech input) based on various parameters. For example, this order may be based on an order in which people have raised their hands or made gestures (e.g., those first to make such gestures have first priority of use of the mobile audio input device(s)), such as in a large auditorium after a speaker has concluded his/her presentation.

In another embodiment of the present invention, the order of priority for using the mobile audio input device is based on a biometric sensor reading of a cognitive state and/or mood of a particular user. For example, a biometric sensor (either a remote sensor on the drone or a personal sensor on the user's person) may detect a state of anticipation (e.g., sweat detected by a sweat biometric sensor on the user's body), anger (e.g., a facial expression of the user as captured by a camera on the drone), agitation (e.g., increased heart rate as detected by a heart monitor worn by the user), etc.

In another embodiment of the present invention, the order of priority for using the mobile audio input device is based on predetermined user criteria. For example, the system may be configured to give priority of use of the mobile audio input device to persons having certain educational backgrounds, certain job descriptions, certain job titles, a history of asking questions or not asking questions during a current or past meetings, etc.

In one or more embodiments of the present invention, the order of priority for using the mobile audio input device is determined by matching a topic of a meeting with the profile of user. For example, assume that a seminar is being held on the topic of economics. Assume further that there are hundreds of participants in the audience at the seminar, each having different profiles/backgrounds. The system will identify persons who wish to use the mobile audio input device (e.g., to ask the seminar panel members a question or to offer an opinion on the subject of the seminar) as determined by hand waving, etc. as described herein. The system will then give priority to persons who have a profile that matches the topic of the seminar. For example, if a Nobel laureate in the field of economics is in the audience, that person would be given priority of use of the mobile audio input device over a person whose profile shows no background in the field of economics.

Thus, the system will maneuver the mobile audio input device (e.g., a flying drone that has a microphone attached thereto) to people in an audience or in a meeting based on various factors such as the expertise of a participant, the background of a participant, the speaking history of a participant, etc.

As another exemplary example of the functioning of the system presented herein, consider a conference on the topic of IoT (Internet of Things). Maja starts asking questions about APIs (application programming interfaces) and their use for IoT. The system detects that Mary and Ashley also want to ask questions. Mary is known (from past interactions) to ask provocative questions, and to take a lot of time. Ashley's interest is in inference of data in IoT. Various expertise levels of the audience members may be considered. The system may give priority to Ashley, so as to control the time better when it's Mary's turn.

In one or more embodiments of the present invention, the mobile audio input device leaves a particular person after that particular person has spoken for a certain time (e.g., a drone with a microphone flies away to give someone else a turn to ask a question). This can be useful when there is limited time to ask questions, and it is not desirable to have one person monopolize the conversation.

Although aerial drones are typically quiet (especially when electric), in one or more embodiments noise suppression systems are used to quiet any noise from the drone. For example, assume that an electric flying drone emits a constant periodic noise from its propellers and engines. The system will generate an inverse sound through a speaker that effectively cancels/reduces this noise. That is, whenever the drone emits a positive pressure sound wave, this positive pressure sound wave is captured by a microphone and sent to a processor on the drone. The processor then generates a negative pressure sound wave of equal intensity, which physically cancels out the positive pressure sound wave (i.e., cancels the noise of the drone) when played on a local speaker.

In one or more embodiments of the present invention, the mobile audio input device includes a pointing device, such as a laser pointer, thus allowing the user to reference objects while they speak into the device.

In one or more embodiments of the present invention, a wireless mute button is provided to the system, thus allowing the lecturer or discussion leader to control when the mobile audio input device (e.g., microphone equipped drone) will be operative.

In one or more embodiments of the present invention, the system includes an automatic level control for more than one audio signal source (from the drones, smartphones, etc.). For example, an ambiance channel can produce an ambiance audio signal as a reference threshold such as from a noise microphone located away from the program microphones. Variable gain amplifiers in a plurality of program channels selectively gate-open those program channels that have audio present exceeding the ambiance threshold. When the program channels are below the noise threshold and hence inactive, they are gated off and the background noise in the ambiance channel is shunted around the program channel to the output. In one or more embodiments, a control function circuit adjusts the gain of each of the program channels that have been opened as an inverse function of the number of open microphones on drones. In another embodiment, a programmed microcomputer receives as inputs the status signals that represent the gated open or gated off conditions of the program channels. These status signals are processed by a software program in the microcomputer that performs both the functions of gating open individual program channels relative to the background noise level, and setting the gain of each of the program channels according to the microphone function.

In one or more embodiments of the present invention, the mobile audio input device (e.g., the mobile microphone on a drone) is equipped with a display that provides real time feedback to the person who is asking the question. The display can provide information for assisting the person who is asking the question or for managing the flow of the entire lecture/presentation.

For example, if the allowed time for the question is almost over, the display can display the remaining time. For example, the phrase could be "Please finish your questions in 10 seconds."

Several people may be vying for one or more available mobile audio input devices. In one embodiment of the present invention, this issue is resolved using an automated distributed leader election for performing microphone/drone usage negotiation. For example, assume that multiple drones are networked together (i.e., can communicate amongst themselves). As such, the drones can determine which drone is to be given priority over other drones based on the capabilities of the drones (e.g., their respective abilities to capture sound, recognize movement, etc.) and/or their proximity to an optimal user (e.g., a person in the audience who has been identified as an expert in the topic being presented in the seminar). The drones will negotiate amongst themselves to identify this "alpha" drone, which is activated first.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by drone on-board computer 123 and/or software deploying server 149 and/or positioning system 151 and/or drone controller 155 shown in FIG. 1, and/or drone mechanisms controller 401 and/or drone on-board computer 423 shown in FIG. 4, and/or drone controller device 555 shown in FIG. 5.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a camera 119 (i.e., a digital camera capable of capturing still and moving images), a media tray 121 (which may include storage devices such as CD-ROM drives, multi-media interfaces, etc.), and external USB port(s) 125. While the format of the ports connected to I/O interface 115 may be any known to those skilled in the art of computer architecture, in one embodiment some or all of these ports are universal serial bus (USB) ports.

Also coupled to I/O interface 115 is a positioning system 151, which determines a position of computer 101 and/or other devices using positioning sensors 153. Positioning sensors 153 may be any type of sensors that are able to determine a position of a device, including computer 101, an aerial drone 200 shown in FIG. 2, a terrestrial drone 300 shown in FIG. 3, a portable electronic device such as the smart phone 509 shown in FIG. 5, etc. Positioning sensors 153 may utilize, without limitation, satellite based positioning devices (e.g., global positioning system—GPS based devices), accelerometers (to measure change in movement), barometers (to measure changes in altitude), etc.

As depicted, computer 101 is able to communicate with a software deploying server 149 and/or other devices/systems (e.g., drone on-board computer 123 and/or a software deploying server 149 and/or a drone controller 155) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing.

While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory also include Logic for Managing Drone Operations (LMDO) 147. LMDO 147 includes code for implementing the processes described below, including those described in FIGS. 2-6. In one embodiment, computer 101 is able to download LMDO 147 from software deploying server 149, including in an on-demand basis. In one embodiment, software deploying server 149 is able to execute one or more instructions from LMDO 147 and provide the results to computer 101, thus relieving computer 101 from the need to utilize its internal processing power.

A drone controller 155 is able to communicate with computer 101 via network 127. Drone controller 155 is a wireless controller that controls a drone (e.g., aerial drone 200 shown in FIG. 2 and/or terrestrial drone 300 shown in FIG. 3) either autonomously or under the instructions/input entered by a user of the drone controller 155.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Figure 2:
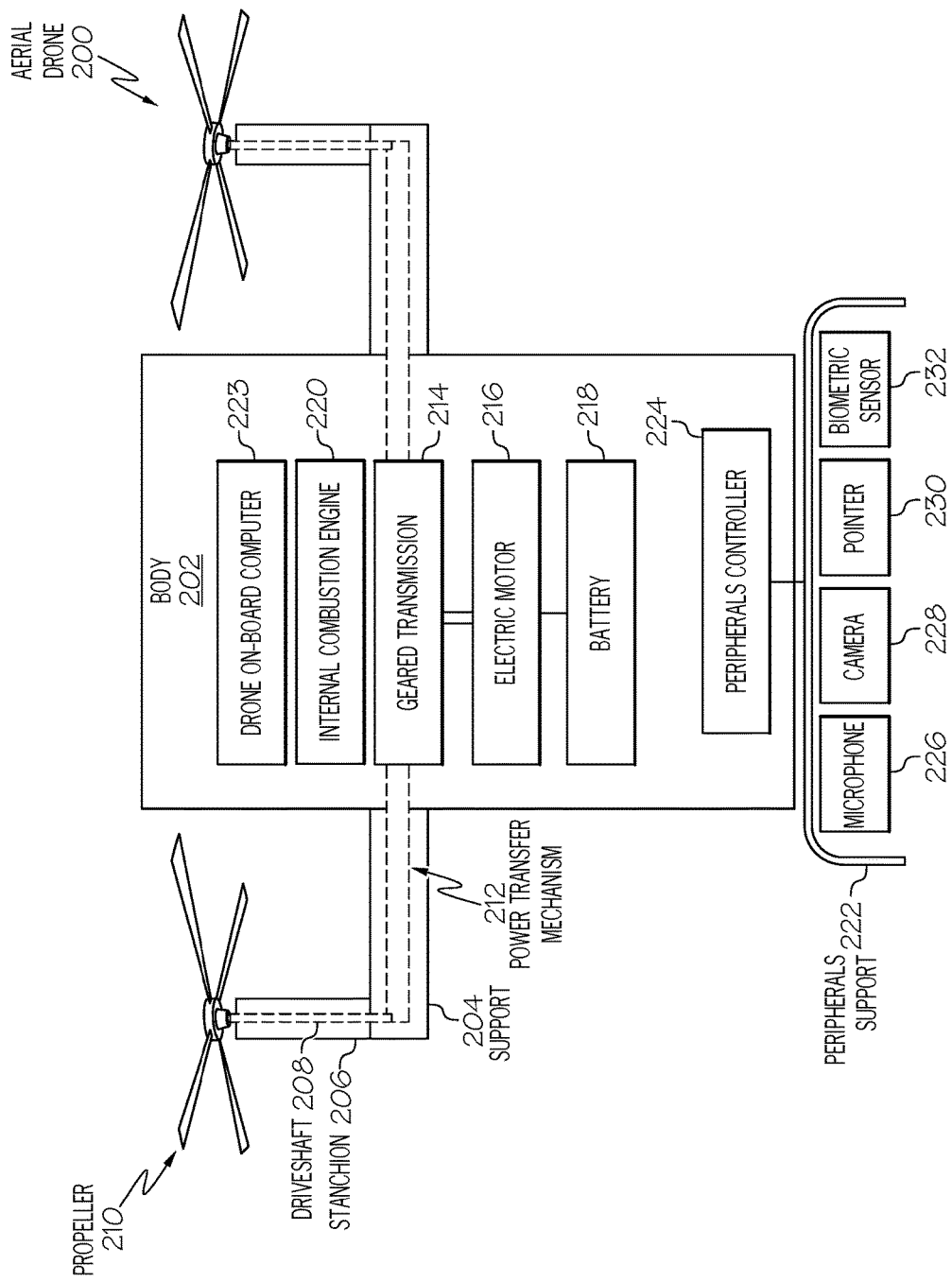
FIG. 2 depicts an exemplary aerial drone used in accordance with one or more embodiments of the present invention.

FIG. 2 illustrates an exemplary aerial drone 200 that may be used in accordance with one or more embodiments of the present invention. The terms "aerial drone" and "unmanned aerial vehicle" ("UAV") are used interchangeably herein to identify and describe an airborne vehicle that is capable of pilot-less flight.

As shown in FIG. 2, aerial drone 200 includes a body 202, which is attached to supports such as support 204. Supports such as support 204 support stanchions such as stanchion 206. Such stanchions provide a housing for a driveshaft within each of the stanchions, such as the depicted driveshaft 208 within stanchion 206. These driveshafts are connected to propellers. For example, driveshaft 208 within stanchion 206 is connected to propeller 210.

A power transfer mechanism 212 (e.g., a chain, a primary driveshaft, etc.) transfers power from a geared transmission 214 to the driveshafts within the stanchions (e.g., from geared transmission 214 to the driveshaft 208 inside stanchion 206), such that propeller 210 is turned, thus providing lift and steering to the aerial drone 200. Geared transmission 214 preferably contains a plurality of gears, such that a gear ratio inside geared transmission 214 can be selectively changed.

Power to the geared transmission 214 is selectively provided by an electric motor 216 (which is supplied with electrical power by a battery 218) or an internal combustion engine 220, which burns fuel from a fuel tank (not shown). In one or more embodiments of the present invention, the internal combustion engine 220 has greater power than the electric motor 216, since internal combustion engines are able to produce greater torque/power and have a greater range (can fly farther) than electric motors of the same size/weight. However, internal combustion engine 220 is louder than electric motor 216, and thus electric motor 216 is a preferred source of power for the aerial drone 200.

Affixed to the bottom of body 202 is a peripherals support 222 that holds a microphone 226, a camera 228, a pointer 230 and/or a biometric sensor 232. A peripherals controller 224 is able to direction the positioning of the microphone 226, aim, focus, etc. camera 228, control the movement of pointer 230, and/or operate biometric sensor 232, all preferably under the control of the drone on-board computer 223.

For example, the microphone 226 can be a directional microphone, that is aimed at a particular person. This aiming is performed by positioning devices (e.g., electromechanical servos the aim the microphone 226). Similarly, the peripherals controller 224 can mute noise from the aerial drone 200 by generating and projecting anti-phase sound pressure that is opposite that produced by the aerial drone 200, thus quieting the aerial drone 200.

Similarly, camera can be aimed and/or focused using electromechanical servos that aim the camera 228 towards a particular person, and/or to adjust the focus onto that particular person.

Similarly, pointer 230 may be a laser pointer or similar electronic pointing device that aims a light or other signal onto a particular location. For example, if pointer 230 is a laser pointer, then the peripherals controller 224 can use a system of electromechanical servos to aim that laser beam from the laser pointer to a particular object on a screen. Alternatively, pointer 230 may be a wireless pointer that directs a remote electronic display (e.g., a light emitting diode (LED) screen) to project a particular icon, based on where the wireless (e.g., infrared) pointer is aimed at the LED screen (assuming that the LED screen is able to detect infrared energy from the pointer 230).

Furthermore, the peripherals controller 224 may control operations of the biometric sensor 232, which may be a camera for detecting facial expressions (indicative of certain biometric states such as agitation, anger, fear, etc.); or a heat sensor for detecting heat levels of a person (also indicative of various emotional states such as anger, fear, etc.); or a remote heat monitor that picks up heart rate based on sensing frequency of movement of carotid arteries of a particular person; etc.

Figure 3:
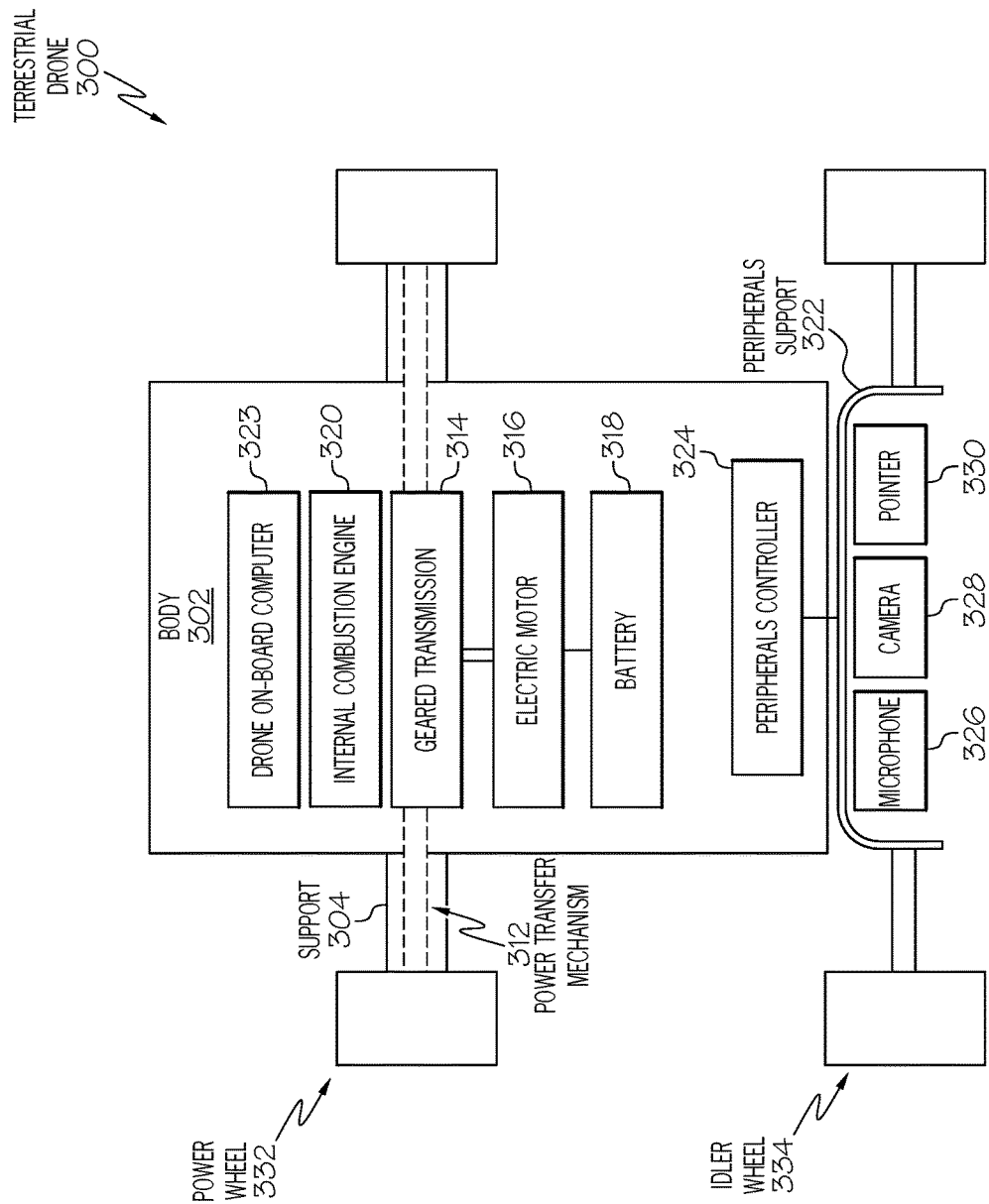
FIG. 3 depicts an exemplary terrestrial drone used in accordance with one or more embodiments of the present invention.

With reference to FIG. 3, an exemplary terrestrial drone 300 that may be used in accordance with one or more embodiments of the present invention is presented. The term "terrestrial drone" is used to identify an autonomous vehicle that moves across land, such as a small crawler, wheeled device, etc.

As with the aerial drone 200 shown in FIG. 2, terrestrial drone 200 includes a body 302, which is attached to supports such as support 304. Supports such as support 304 support wheels such as power wheel 332. That is, support 304 provides both a support for power wheel 332 as well as a housing for a driveshaft (e.g., power transfer mechanism 312). Power transfer mechanism 312 (e.g., a chain, a primary driveshaft, etc.) transfers power from a geared transmission 314 to the power wheel 332. Geared transmission 314 preferably contains a plurality of gears, such that a gear ratio inside geared transmission 314 can be selectively changed.

Power to the geared transmission 314 is selectively provided by an electric motor 316 (which is supplied with electrical power by a battery 318) or an internal combustion engine 320, which burns fuel from a fuel tank (not shown). In one or more embodiments of the present invention, the internal combustion engine 320 has greater power than the electric motor 316, since internal combustion engines are able to produce greater torque/power and have a greater range (can drive farther) than electric motors of the same size/weight. However, internal combustion engine 320 is louder than electric motor 316, and thus electric motor 316 is a preferred source of power for the terrestrial drone 300, as well as the aerial drone 200 shown in FIG. 2.

Also affixed to body 302 is a peripherals support 322 that holds a microphone 326, a camera 328, and/or a pointer 330, which perform the same operations described in FIG. 2 for microphone 226, camera 228, and pointer 230. As with peripherals controller 224 described in FIG. 2, peripherals controller 324 shown in FIG. 3 controls (preferably under the higher control of the drone on-board computer 323) the operations of microphone 326, camera 328, and pointer 330.

In order to provide additional stability to terrestrial drone 300, other power wheels (either not shown or not labeled) are installed on the terrestrial drone 300. Alternatively, such additional stability is provided by non-powered wheels, such as the depicted idler wheel 334.

Figure 4:
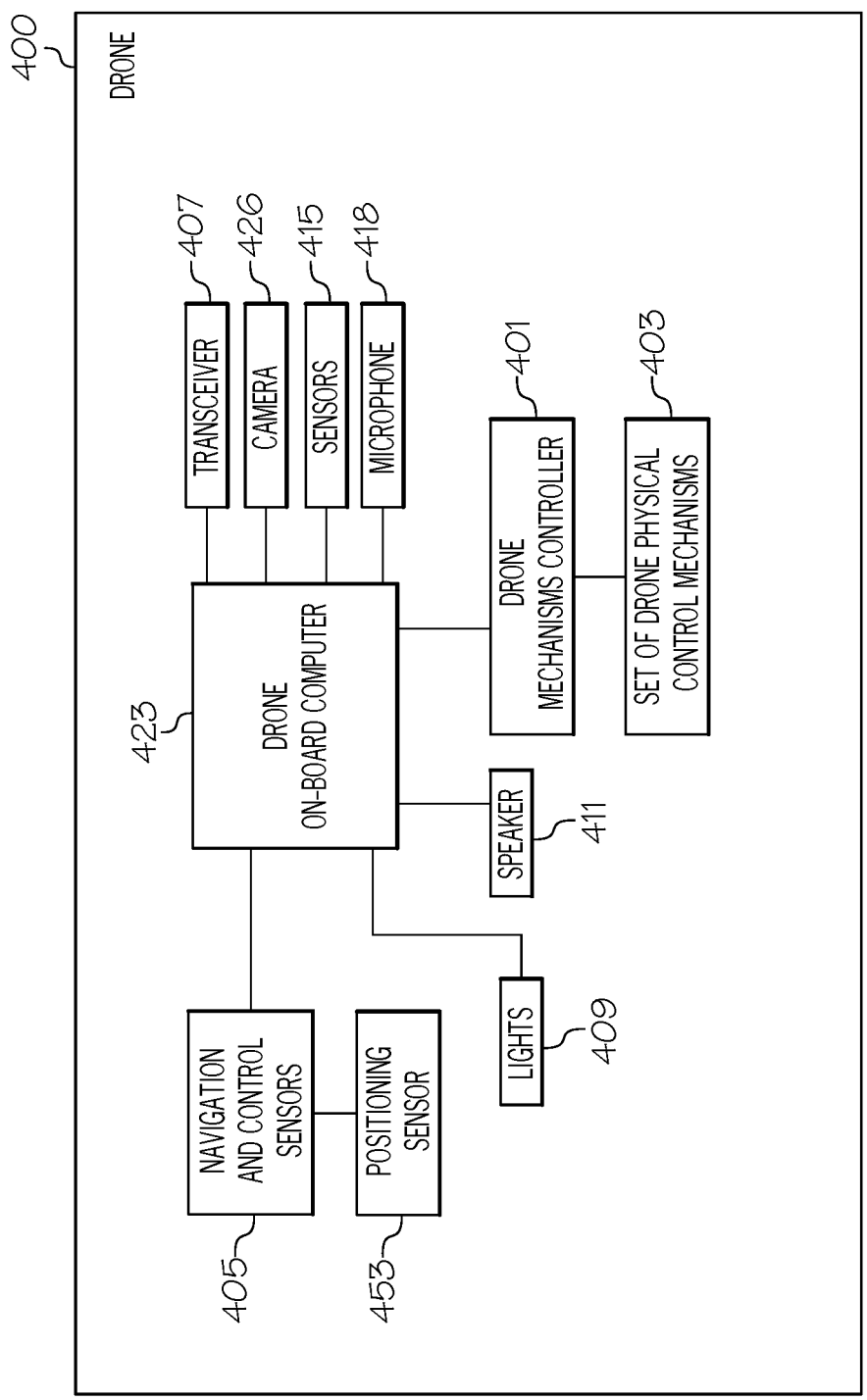
FIG. 4 illustrates control hardware and other hardware features of a drone used in accordance with one or more embodiments of the present invention.

With reference now to FIG. 4, exemplary control hardware within a drone 400 (e.g., aerial drone 200 shown in FIG. 2 and/or terrestrial drone 300 shown in FIG. 3) is depicted.

A drone on-board computer 423 (analogous to drone on-board computer 223 shown in FIG. 2 and/or drone on-board computer 323 shown in FIG. 3) controls a drone mechanisms controller 401, which is a computing device that controls a set of drone physical control mechanisms 403. The set of drone physical control mechanisms 403 includes, but is not limited to, throttles for internal combustion engine 220/320 and/or electric motor 216/316, selectors for selecting gear ratios within the geared transmission 214/314, controls for adjusting the pitch, roll, and angle of attack of propellers such as propeller 210 and other controls used to control the operation and movement of the aerial drone 200 depicted in FIG. 2, steering power wheel 332 and/or idler wheel 334 of the terrestrial drone 300 depicted in FIG. 3, etc.

Whether in autonomous mode or remotely-piloted mode, the drone on-board computer 423 controls the operation of drone 400. This control includes the use of outputs from navigation and control sensors 405 to control the drone 400. Navigation and control sensors 405 include hardware sensors that (1) determine the location of the drone 400; (2) sense other drones and/or obstacles and/or physical structures around drone 400; (3) measure the speed and direction of the drone 400; and (4) provide any other inputs needed to safely control the movement of the drone 400.

With respect to the feature of (1) determining the location of the drone 400, this is achieved in one or more embodiments of the present invention through the use of a positioning system such as positioning system 151 (shown in FIG. 1), which may be part of the drone on-board computer 423, combined with positioning sensor 453. Positioning system 151 may use a global positioning system (GPS), which uses space-based satellites that provide positioning signals that are triangulated by a GPS receiver to determine a 3-D geophysical position of the drone 400. Positioning system 151 may also use, either alone or in conjunction with a GPS system, physical movement sensors such as accelerometers (which measure changes in direction and/or speed by an aerial drone in any direction in any of three dimensions), speedometers (which measure the instantaneous speed of an aerial drone), air-flow meters (which measure the flow of air around an aerial drone), barometers (which measure altitude changes by the aerial drone), etc. Such physical movement sensors may incorporate the use of semiconductor strain gauges, electromechanical gauges that take readings from drivetrain rotations, barometric sensors, etc.

With respect to the feature of (2) sensing other aerial drones and/or obstacles and/or physical structures around drone 400, the drone on-board computer 423 may utilize radar or other electromagnetic energy that is emitted from an electromagnetic radiation transmitter (e.g., transceiver 407 shown in FIG. 4), bounced off a physical structure (e.g., a building, bridge, or another aerial drone), and then received by an electromagnetic radiation receiver (e.g., transceiver 407). By measuring the time it takes to receive back the emitted electromagnetic radiation, and/or evaluating a Doppler shift (i.e., a change in frequency to the electromagnetic radiation that is caused by the relative movement of the drone 400 to objects being interrogated by the electromagnetic radiation) in the received electromagnetic radiation from when it was transmitted, the presence and location of other physical objects can be ascertained by the drone on-board computer 423.

With respect to the feature of (3) measuring the speed and direction of the drone 400, this is accomplished in one or more embodiments of the present invention by taking readings from an on-board airspeed indicator (not depicted) on the drone 400 and/or detecting movements to the control mechanisms on the aerial drone 200 (depicted in FIG. 2) and/or detecting movements to the control mechanisms on the terrestrial drone 300 (depicted in FIG. 3) and/or the positioning system 151 discussed above.

With respect to the feature of (4) providing any other inputs needed to safely control the movement of the drone 400, such inputs include, but are not limited to, control signals to direct the aerial drone 400 to make an emergency landing, etc.

Also on drone 400 in one or more embodiments of the present invention is a camera 426, which is capable of sending still or moving visible light digital photographic images (and/or infrared light digital photographic images) to the drone on-board computer 423. These images can be used to determine the location of the aerial drone 400 (e.g., by matching to known landmarks), to sense other drones/obstacles, and/or to determine speed (by tracking changes to images passing by) of the aerial drone.

Also on aerial drone 400 in one or more embodiments of the present invention are sensors 415. Examples of sensors 415 include, but are not limited to, air pressure gauges, microphones, barometers, chemical sensors, vibration sensors, etc., which detect a real-time operational condition of drone 400 and/or an environment around drone 400. Another example of a sensor from sensors 415 is a light sensor, which is able to detect light from other drones, auditorium lights, etc., in order to ascertain the environment in which drone 400 is operating.

Also on drone 400 in one or more embodiments of the present invention are lights 409. Lights 409 are activated by drone on-board computer 423 to provide visual warnings, alerts, indications of microphone activation, etc. as described herein.

Also on drone 400 in one or more embodiments of the present invention is a speaker 411. Speaker 411 is used by drone on-board computer 423 to provide aural warnings, alerts, etc., as well as generating noise cancellation sound as described herein.

Also on drone 200 in one or more embodiments of the present invention is a microphone 418. In an embodiment, microphone 418 is an omnidirectional sensor that measures ambient noise (e.g., sound produced by the drone 400), in order to generate noise-cancelling sound from the speaker 411. In another embodiment, microphone 418 is a directional microphone (e.g., that captures sounds at some distance away from the drone 400) used to capture speech from users.

Figure 5:
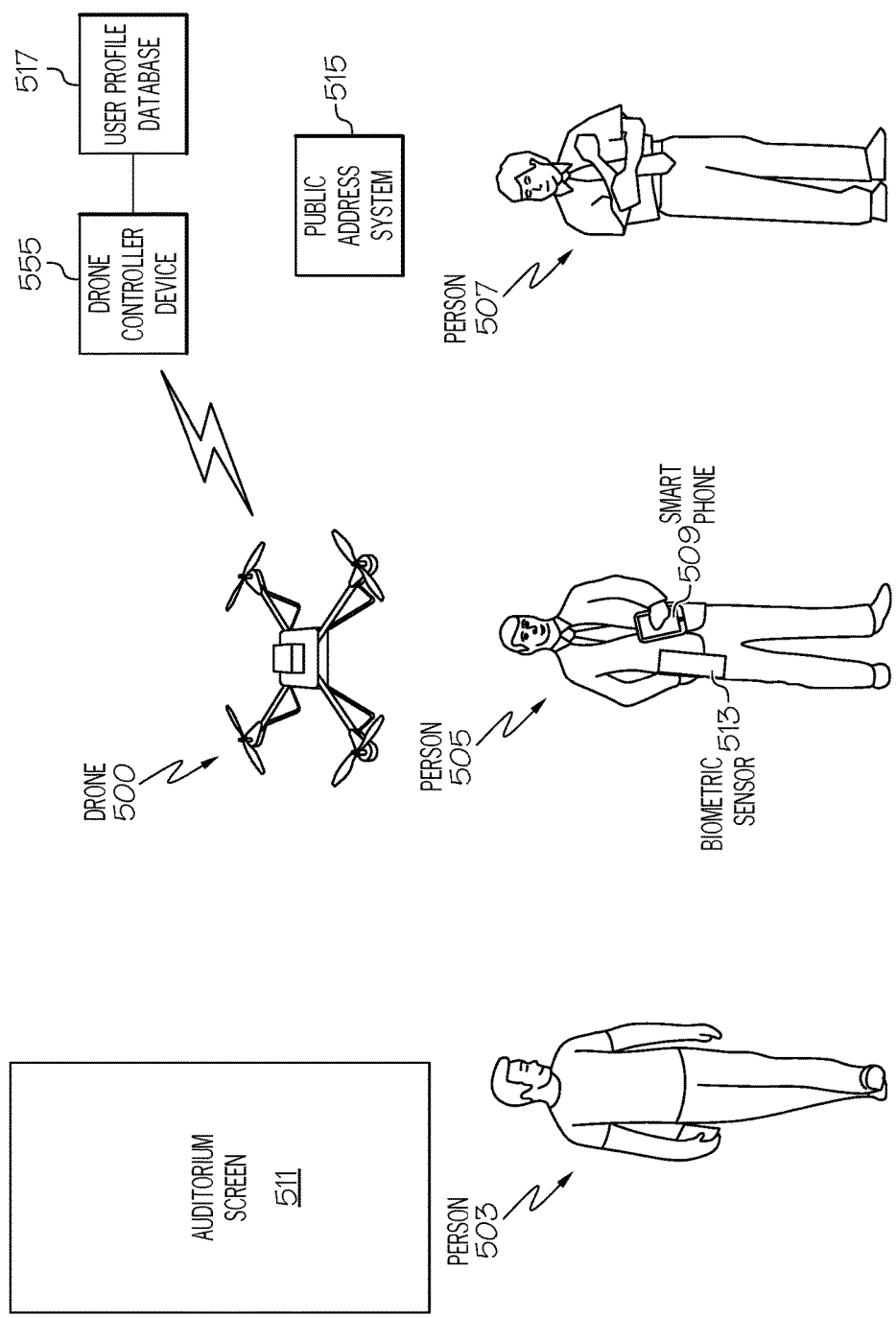
FIG. 5 depicts an aerial drone being utilized in accordance with one or more embodiments of the present invention.

With reference now to FIG. 5, assume that one or more drones act as mobile audio input devices (i.e., mobile microphones) are in use in an auditorium for selectively capturing the speech of persons within the auditorium. For example, assume that person 503, person 505, and person 507 are members of an audience in an auditorium. Assume now that person 505 would like to engage in a dialog with panel members (not shown) who are presenting a seminar in the auditorium. As such, person 505 needs access to a microphone, so that the panel members can hear him/her.

The present invention uses a drone 500 that is equipped with a wireless microphone (e.g., aerial drone 400 as shown in FIG. 4). The movement of drone 500 and the wireless microphone is controlled by a drone controller device 555. When drone 500 is close enough to person 505 to capture his/her speech with an on-board microphone (e.g., microphone 226 shown in FIG. 2), that captured speech is digitized and sent to a public address system 515, which includes a receiver, an amplifier, and speakers for reproducing the captured speech of person 505.

For example, assume that person 505 is waving his hand, as shown in FIG. 5. A camera (e.g., camera 228 shown in FIG. 2) detects this hand waving, identifies the location of person 505 (e.g., using triangulation between the drone 500 as it moves and the movement of the camera 228 while tracking person 505), and then sends the drone 500 to hover at this location.

Alternatively, drone controller device 555 and/or a drone on-board controller within drone 500 are able to "hone in" on a signal being emitted from an electronic device being held by person 505 (e.g., the depicted smart phone 509), in order to identify where drone 500 (and its attached microphone) should go.

As shown in FIG. 5, at this point drone 500 does not move to the location of person 503 or person 507, since they (or their electronic devices) have issued no indication that they want to speak.

In an embodiment of the present invention, person 505 is able to control (e.g., via instructions input into his smart phone 509 and transmitted to the peripherals controller 224 (see FIG. 2) on the drone 500) the movement of a pointer (e.g., a laser pointer such as pointer 230 shown in FIG. 2) in order to shine a laser beam onto an auditorium screen 511. That is, assume that a slide is being projected onto auditorium screen 511. Person 505 is thus able to user his smart phone 509 to cause the laser pointer on drone 500 to point to a particular spot on that slide.

In an embodiment of the present invention, person 505 is selected to use drone 500 and its attached microphone based on a biometric sensor 513 that is worn by the person (or is part of smart phone 509). Examples of biometric sensor 513 include, but are not limited to, a heart rate monitor, a skin galvanometer, a respiratory monitor, a skin thermometer, etc., all of which are indicative of certain physiological and/or emotional states, such as agitation, anger, happiness, etc. Thus, if person 505 is deemed to be particularly agitated, then drone 500 may be directed to travel to his location in order to determine what is causing his agitation. Alternatively, if person 505 is deemed to be particularly agitated, then drone 500 may be directed avoid his location, lest he is disruptive to the seminar being held in the auditorium.

In an embodiment of the present invention, person 505 is selected to use drone 500 and its attached microphone according to his profile found in a user profile database 517, which is accessible to the drone controller device 555. For example, assume that person 505 is identified as "Dr. A" (e.g., from facial recognition from a photo of person 505 taken by drone 500, an identifier of person 505 transmitted from smart phone 509, a radio frequency identifier (RFID) chip in a seminar access badge worn by person 505, etc.). As such, if Dr. A has a history of asking intelligent questions at other seminars having a similar topic as a current seminar in the auditorium being services by drone 500, the drone 500 may be preemptively directed to the location of person 505. Alternatively, if Dr. A has no background in the topic of the current seminar (as determined by his profile found in user profile database 517), then drone 500 may be directed to avoid the location of person 505, since his question/comment is unlikely to be elucidating.

Figure 6:
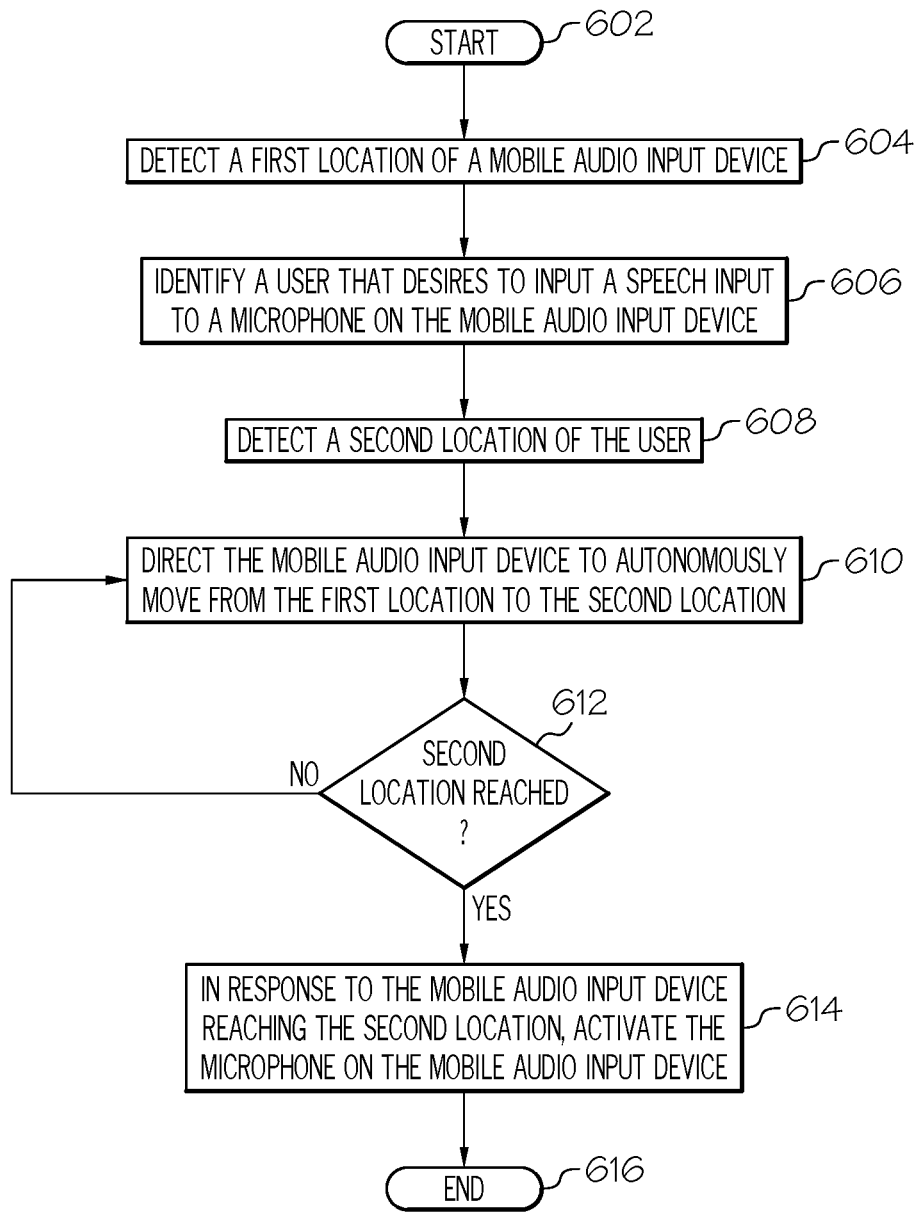
FIG. 6 is a high-level flow chart of one or more steps performed by one or more computing and/or other hardware devices to control movement of a drone being used as a mobile audio input device in accordance with one or more embodiments of the present invention.

With reference now to FIG. 6, a high-level flow chart of one or more steps performed by one or more computing and/or other hardware devices to control movement of an aerial drone within a predetermined location (e.g., within an auditorium in which a seminar is being held) in accordance with one or more embodiments of the present invention is presented.

After initiator block 602, one or more processors (e.g., within drone 500 and/or drone controller device 555 shown in FIG. 5) detect a first location of a mobile audio input device (e.g., the current location of drone 500 shown in FIG. 5), as described in block 604.

As described in block 606, the processor(s) identify a user (e.g., person 505 shown in FIG. 5) that desires to input a speech input to a microphone (e.g., microphone 226 shown in FIG. 2) on the mobile audio input device. In one or more embodiments, the user (e.g., person 505) is not interested in just using microphone 226, or in an alternative embodiment, not even using microphone 226 at all, but rather is interested in using camera 228 to take an image of something that he would like for the camera 228 on drone 500 to capture and send to the auditorium screen 511. Similarly, the user may be interested in using (in one embodiment, only using) the pointer 230 described in FIG. 2.

With reference now to block 608, in FIG. 6, the processor(s) then detect a second location of the user (e.g., the current location of person 505 shown in FIG. 5).

As described in block 610, the processor(s) then direct the mobile audio input device to autonomously move (e.g., using the mechanisms shown in FIG. 4) from the first location (where the drone is currently located) to the second location (where the person wanting to speak is located).

As described in query block 612, the processor(s) make a determination as to whether the mobile audio input device has reached the second location (e.g., is drone 500 now hovering over person 505).

If so, then as described in block 614, the processor(s) activate the microphone on the mobile audio input device, such that the user's speech can be wirelessly captured and sent to a public address system within the auditorium.

The flow-chart ends at terminator block 616.

In an embodiment of the present invention, the processor(s) detect a physical gesture (e.g., hand or arm waving) from the user to identify the user that desires to input the speech input to the microphone on the mobile audio input device, as described herein.

In an embodiment of the present invention, if the person waving his hand/arms does so before other persons, then he/she gets to use the drone/microphone before other persons. Thus, the processor(s) prioritize a primary user over other users from the group of users based on the primary user making the physical gesture before the other users from the group of users.

In an embodiment of the present invention, the processor(s) detect a signal from an electronic device (e.g., smart phone 509 shown in FIG. 5) held by the user to identify the user that desires to input the speech input to the microphone on the mobile audio input device. For example, person 505 may touch an icon on his smart phone 509 indicating that he/she desires to speak to the seminar attendees/panel.

In an embodiment of the present invention, if the electronic device (e.g., smart phone 509) is a first user device that is capable of receiving messages from a second electronic device (e.g., another smart phone held by a seminar panel member), the one or more processors enable the first user device to receive a message from the second electronic device in response to the microphone on the mobile audio input device being activated at the second location. Thus, person 505 can have a direct dialog (in text or voice) with the panel member.

In an embodiment of the present invention, the processor(s) detect a signal from an electronic device (e.g., smart phone 509) held by the user indicating that the user desires to input the speech input to the microphone on the mobile audio input device (i.e., person 505 wants to talk into the microphone on drone 500 shown in FIG. 5). The processor(s) then disable the microphone on the mobile audio input device until a signal is received from the electronic device to re-activate the microphone on the mobile audio input device. That is, person 505 now has control over the microphone, such that it does not pick up his speech until person 505 enters a microphone activation input on his smart phone 509, thus activating (turning on) the microphone that is on drone 500. In an embodiment, in response to the microphone on drone 500 being re-activated, the smart phone (or drone controller device 555 of drone 500) provides an indicator on the electronic device that the microphone has been re-activated. For example, if the microphone on drone 500 is turned on, then the screen of the smart phone 509 may turn green.

In an embodiment of the present invention, person 505 shown in FIG. 5 is a primary user from a group of users (e.g., person 503, person 505, and person 507). In this embodiment, the processor(s) prioritize use of the mobile audio input device by the primary user over other users from the group of users based on biometric sensor readings taken for the primary user, as described above.

Other factors that can be used to prioritize who gets to use the microphone on drone 500 first are found in the user profile database 515, such as a particular person's speaking history at a current or similar seminars, level of expertise in the topic of the current seminar, the job, title, resume, etc. of the requesting speaker/user as it relates to the topic of the meeting/seminar, etc. Thus, certain persons can be put on a "whitelist" of preferred speakers, while other persons can be put on a "blacklist" of speakers to be avoided, based on their respective profiles, as related to the topic of the current meeting/seminar.

In an embodiment of the present invention, no particular person is allowed to use the microphone on the drone 500 for too long a period. Thus, the processor(s) determine that the mobile audio input device has been at the second location for more than a predetermined amount of time (e.g., three minutes). In response to determining that the mobile audio input device has been at the second location for more than the predetermined amount of time, the processor(s) issue directions to a controller (e.g., drone on-board computer 423 shown in FIG. 4) on the mobile audio input device to move the mobile audio input device away from the second position (i.e., move away from the current speaker).

In an embodiment of the present invention, upon determining that the mobile audio input device has been at the second location (of the user) for too long (more than a predetermined amount of time), the processor(s) will issue a signal to the electronic device (e.g., a flashing light on the display of the user's smart phone) advising the user that the mobile audio input device will move away from the second position after an additional period of specified time (e.g., the drone and microphone will fly away in 30 seconds).

In an embodiment of the present invention, the mobile audio input device is a primary audio input device from a group of audio input devices within a predefined space. The processor(s) then provide priority of use to the primary audio input device based on a distributed leader election, where the distributed leader election identifies the primary audio input device according to a user of the primary audio input device. That is, if person 505 is deemed to be better qualified to ask intelligent questions than person 503 or person 507 shown in FIG. 5, then person 505 is deemed to be the leader of persons 503/505/507, and drone 500 will be flown to person 505's location.

As described above with regard to pointer 230 shown in FIG. 2, in an embodiment of the present invention the mobile audio input device includes an electronic pointing device that is capable of directing a visual cue (either visibly as a laser beam or instructionally, as a signal to a video controller on a display) on the display. As described herein, the processor(s) receive an instruction (e.g., a user input onto the smart phone 509 shown in FIG. 5) to cause the electronic pointing device to direct a visual cue on the display at a user-selected position. In response to receiving the instruction to cause the electronic pointing device to direct the visual cue on the display at the user-selected position, the processor(s) direct the electronic pointing device to direct the visual cue on the display at the user-selected position.

In an embodiment of the present invention, the mobile audio input device is not a drone, but rather is an electronic device (e.g., a smart phone) that is carried by a user. Thus, if a supervisory computer (e.g., computer 101 shown in FIG. 1) determines that person 505 (holding smart phone 509) is to be designated as a next speaker, then smart phone 509 is activated as a mobile microphone (the mobile audio input device). Thus, person 505 simply speaks directly into smart phone 509, which then transmits his speech input to the public address system 515 shown in FIG. 5.

As described in FIG. 2, in one embodiment of the present invention the mobile audio input device is an aerial drone (aerial drone 200) that is capable of autonomous movement.

As described in FIG. 3, in one embodiment of the present invention the mobile audio input device is a terrestrial drone (terrestrial drone 300) that is capable of autonomous movement.

The present invention may be implemented in one or more embodiments using cloud computing. Nonetheless, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
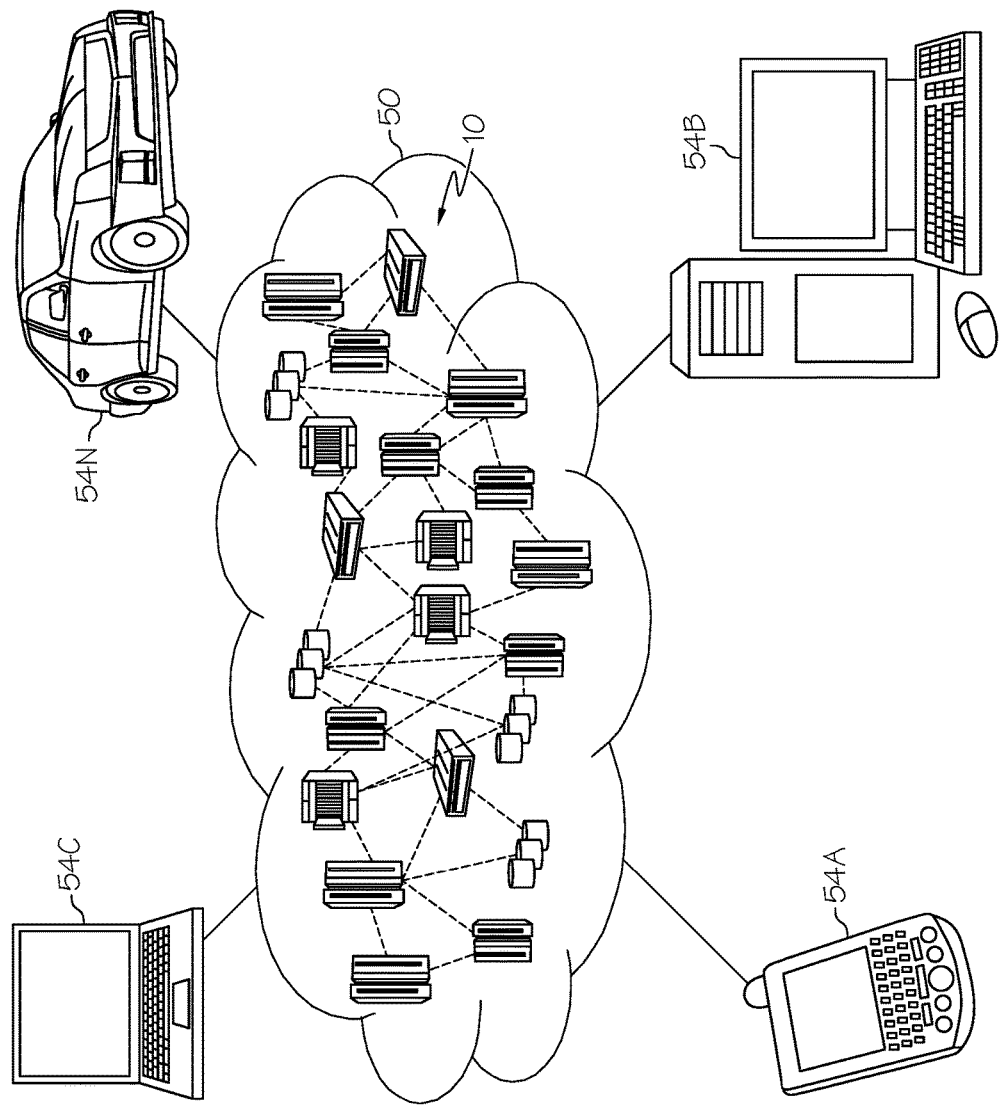
FIG. 7 depicts a cloud computing environment according to an embodiment of the present invention.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 6 are intended to be illustrative only and that computing nodes 10 and cloud computing environment 50 can communicate with any type of computerized device over any type of network and/or network addressable connection (e.g., using a web browser).

Figure 8:
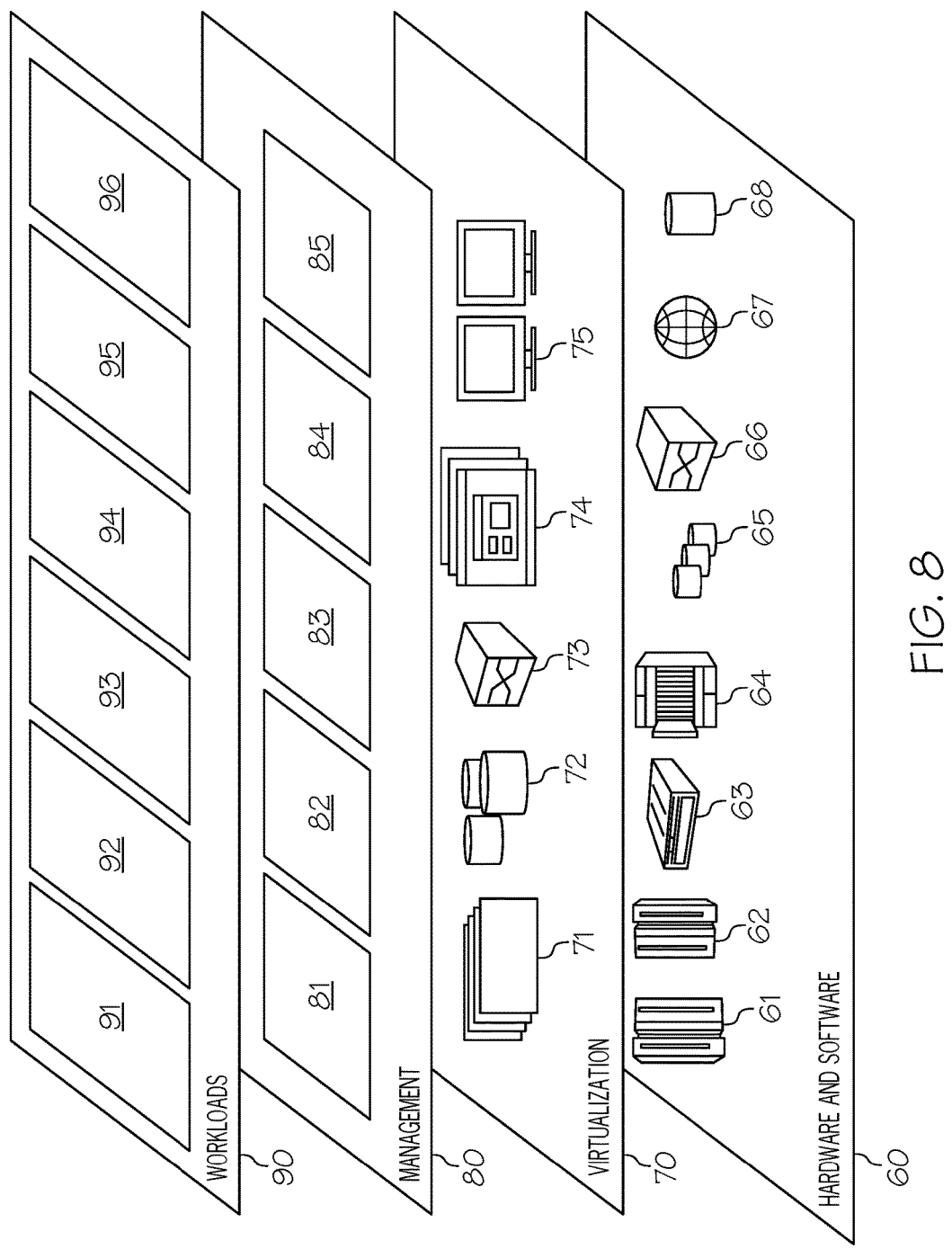
FIG. 8 depicts abstraction model layers of a cloud computer environment according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and drone control processing 96.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
   detecting, by one or more processors, a first location of a mobile audio input device;
   detecting, by one or more processors, a second location of a user;
   directing, by one or more processors, the mobile audio input device to autonomously move from the first location to the second location;
   determining, by one or more processors, that the mobile audio input device has reached the second location; and
   in response to the mobile audio input device reaching the second location, activating the microphone on the mobile audio input device.

2. The method of claim 1, further comprising:
   detecting, by one or more processors, a physical gesture from the user to identify the user that desires to input the speech input to the microphone on the mobile audio input device.

3. The method of claim 2, wherein the user is a primary user from a group of users, and wherein the method further comprises:
   prioritizing, by one or more processors, the primary user over other users from the group of users based on the primary user making the physical gesture before the other users from the group of users.

4. The method of claim 1, further comprising:
   detecting, by one or more processors, a signal from an electronic device held by the user to identify the user that desires to input the speech input to the microphone on the mobile audio input device.

5. The method of claim 4, wherein the electronic device is a first user device that is capable of receiving messages from a second electronic device, and wherein the method further comprises:
   enabling, by one or more processors, the first user device to receive a message from the second electronic device in response to the microphone on the mobile audio input device being activated at the second location.

6. The method of claim 1, further comprising:
   detecting, by one or more processors, a signal from an electronic device held by the user that the user desires to input the speech input to the microphone on the mobile audio input device; and
   disabling, by one or more processors, the microphone on the mobile audio input device until a signal is received from the electronic device to re-activate the microphone on the mobile audio input device.

7. The method of claim 6, further comprising:
   in response to the microphone being re-activated, providing, by one or more processors, an indicator on the electronic device that the microphone has been re-activated.

8. The method of claim 1, wherein the user is a primary user from a group of users, and wherein the method further comprises:
   prioritizing, by one or more processors, use of the mobile audio input device by the primary user over other users from the group of users based on biometric sensor readings taken of the primary user.

9. The method of claim 1, wherein the user is a primary user from a group of users, and wherein the method further comprises:
   prioritizing, by one or more processors, use of the mobile audio input device by the primary user over other users from the group of users based on a personal profile of the primary user.

10. The method of claim 1, further comprising:
    determining, by one or more processors, that the mobile audio input device has been at the second location for more than a predetermined amount of time; and
    in response to determining that the mobile audio input device has been at the second location for more than the predetermined amount of time, issuing, by one or more processors, directions to a controller on the mobile audio input device to move the mobile audio input device away from the second position.

11. The method of claim 1, further comprising:
    determining, by one or more processors, that the mobile audio input device has been at the second location for more than a predetermined amount of time; and
    in response to determining that the mobile audio input device has been at the second location for more than the predetermined amount of time, issuing, by one or more processors, a signal to an electronic device advising the user that the mobile audio input device will move away from the second position after an additional period of specified time.

12. The method of claim 1, wherein the mobile audio input device is a primary audio input device from a group of audio input devices within a predefined space, and wherein the method further comprises:
    providing, by one or more processors, priority of use to the primary audio input device based on a distributed leader election, wherein the distributed leader election identifies the primary audio input device according to a user of the primary audio input device.

13. The method of claim 1, wherein the mobile audio input device comprises an electronic pointing device that is capable of directing a visual cue on a display, and wherein the method further comprises:
    receiving, by one or more processors, an instruction to cause the electronic pointing device to direct a visual cue on the display at a user-selected position; and
    in response to receiving the instruction to cause the electronic pointing device to direct the visual cue on the display to the user-selected position, directing, by one or more processors, the electronic pointing device to direct the visual cue on the display at the user-selected position.

14. The method of claim 1, wherein the mobile audio input device is a smart phone being carried by the user, and wherein the method further comprises:
    determining, by one or more processors, that the user holding the smart phone is to be designated as a next speaker; and
    in response to determining that the user holding the smart phone is to be designated as the next speaker, activating, by one or more processors, the smart phone as the mobile audio input device.

15. The method of claim 1, wherein the mobile audio input device is an aerial drone that is capable of autonomous movement.

16. The method of claim 1, wherein the mobile audio input device is a terrestrial drone that is capable of autonomous movement.

17. A computer program product comprising one or more computer readable storage mediums, and program instructions stored on at least one of the one or more computer readable storage mediums, the stored program instructions comprising:
- program instructions to detect a first location of a mobile audio input device;
- program instructions to detect a second location of the user;
- program instructions to direct the mobile audio input device to autonomously move from the first location to the second location;
- program instructions to determine that the mobile audio input device has reached the second location; and
- program instructions to, in response to the mobile audio input device reaching the second location, activate the peripheral on the mobile audio input device.

18. The computer program product of claim 17, wherein the peripheral device is from a group consisting of a microphone, a camera, and a pointer.

19. A computer system comprising one or more processors, one or more computer readable memories, and one or more computer readable storage mediums, and program instructions stored on at least one of the one or more computer readable storage mediums for execution by at least one of the one or more processors via at least one of the one or more computer readable memories, the stored program instructions comprising:
- program instructions to detect a first location of a mobile audio input device;
- program instructions to detect a second location of the user;
- program instructions to direct the mobile audio input device to autonomously move from the first location to the second location;
- program instructions to determine that the mobile audio input device has reached the second location; and
- program instructions to, in response to the mobile audio input device reaching the second location, activate the microphone on the mobile audio input device.

* * * * *